Feb. 25, 1964 M. J. H. STAAR 3,122,371
GRAMOPHONE RECORD DISTRIBUTING DEVICES FOR
GRAMOPHONE RECORD CHANGERS
Filed July 27, 1960 5 Sheets-Sheet 1

INVENTOR
MARCEL JULES HÉLÈNE STAAR

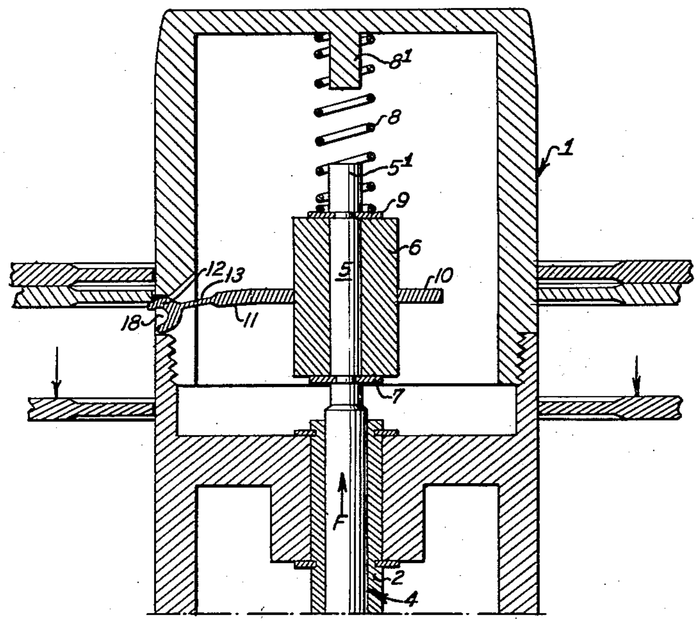
FIG. 3
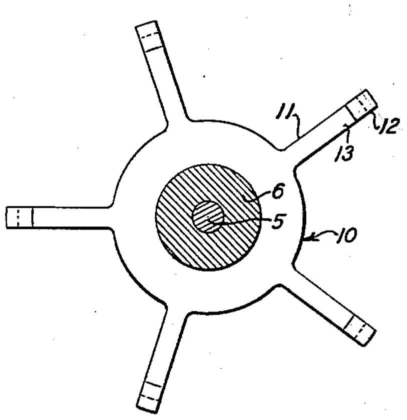
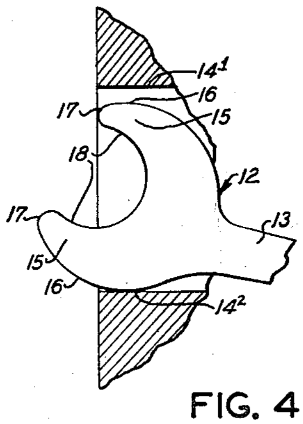
FIG. 4
FIG. 5
INVENTOR
MARCEL JULES HÉLÈNE STAAR
BY
ATTORNEY

INVENTOR
MARCEL JULES HÉLÈNE STAAR

INVENTOR

MARCEL JULES HÉLÈNE STAAR

BY

ATTORNEY

INVENTOR
MARCEL JULES HÉLÈNE STAAR

BY

ATTORNEY 3,122,371

GRAMOPHONE RECORD DISTRIBUTING DEVICES FOR GRAMOPHONE RECORD CHANGERS

Marcel Jules Hélène Staar, 4 Ave. Sylviane, Rhode-Saint-Genese, Belgium

Filed July 27, 1960, Ser. No. 45,704
Claims priority, application Belgium July 31, 1959
9 Claims. (Cl. 274—10)

My present invention relates to automatic gramophone record changers in which a central control column having a standard diameter for standard records or a large diameter for records having a large hole is provided for the support and distribution of the records to be played.

The invention relates more especially to automatic changers designed to accept records of both types, it being possible to fit two appropriate central columns to one and the same mechanism.

Numerous types of central columns have already been proposed including central distribution columns which do not require separate levelling means for holding records in horizontal equilibrium.

These columns are provided with a mechanism which generally has an assembly of separate retractable primary and secondary elements, and the function of which is to free sequentially the gramophone records to be played, the secondary elements coming into operation for the purpose of retaining the remainder of the stack of records when the primary elements are in position for freeing the bottom record, and this operation ceasing when the primary elements have become operative again to support the stack of records to be played.

The small diameter (7 millimetres) standard columns makes it particularly complicated and expensive to incorporate such a mechanism into the column and obtain satisfactory operation thereof.

In large-diameter columns, the design and arrangement of this mechanism is complex when it is desired to insure dependability and flexibility of operation.

An object of the present invention is to obviate these difficulties and provide a device with considerable operational dependability and of a simplicity such that it can be used both in standard columns and in large-diameter columns.

This simplicity, which has the certain advantage of making the construction less expensive, is obtained by the fact that the operations of supporting, separating and distributing the records are carried out solely by operation of elements having two limbs and which, under the control of a central rod, effect in the desired relationship all the movements normally performed separately by the primary and secondary elements.

An additional advantage is that the performance of the usual functions of the primary and secondary elements by said two-limbed elements is effected with all the tolerance of the most improved systems insofar the irregularity of thickness of the records is concerned.

In one embodiment of the invention, the two-limbed elements are mounted to rock perpendicularly to the plane records under the action of the central rod and to occupy two end positions in each of which one of the limbs is alternately extended beyond the radius corresponding to that of the hole of the discs and the other limb is retracted in relation to said radius.

These two-limbed elements may advantageously be of crescent-shape and be of an elastic material so that they can temporarily undergo deformations which make them particularly capable of performing the various operations.

The elastic material may be a synthetic plastic material resistant to wear due to friction and having high elasticity and flexibility such as, for example, a synthetic material like nylon.

The accompanying drawings show different embodiments of the invention by way of example.

FIGURES 2 and 3 are vertical sections on an enlarged scale of the distributing head according to FIGURE 1, with the movable elements in two different positions.

FIGURE 4 is an enlarged view of an elastic element and of a slot provided in the head and in which said element is housed.

FIGURE 5 is an enlarged elevational view of the annular plate mounted on the sleeve.

Figure 7A:
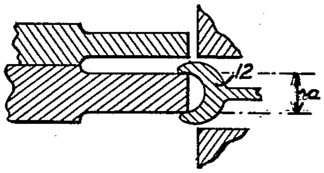
Figure 7B:
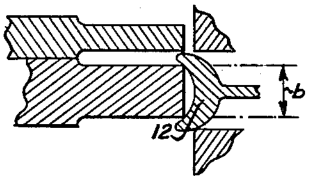

FIGURES 7*a* and 7*b* are diagrammatic views showing how one and the same elastic element "manipulates" records having different thicknesses.

Figure 8:
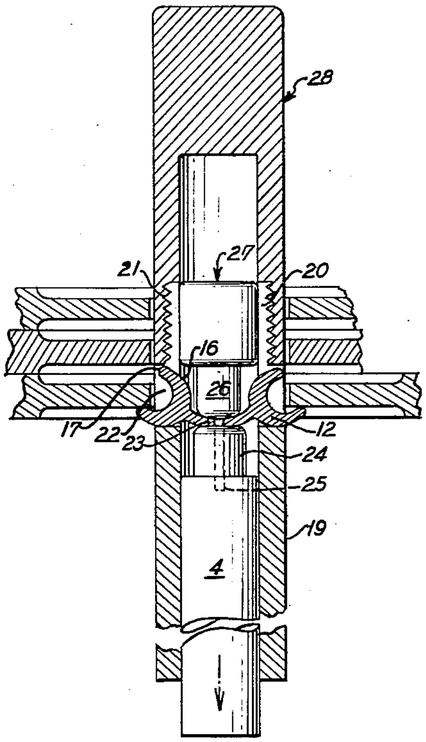
Figure 9:
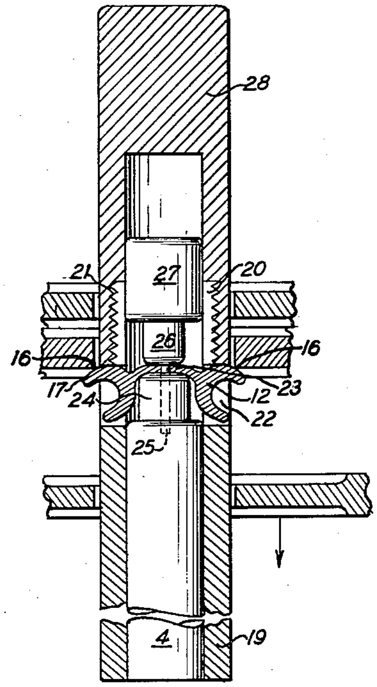

FIGURES 8 and 9 are vertical sections of a hollow rod with the movable elements in two different positions.

Figure 10:
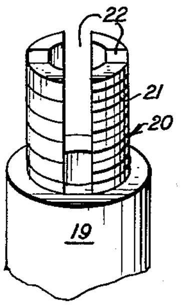

FIGURE 10 is an enlarged detail of the hollow rod according to these figures.

Figure 11:
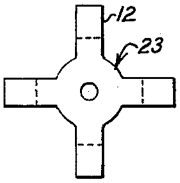

FIGURE 11 is a top plan view of the element of elastic material used in the apparatus of FIGURES 8 and 9.

Figure 12:
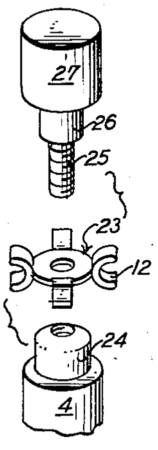

FIGURE 12 is an exploded view intended to show the fitting of the elastic element.

Figure 13A:
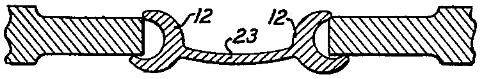
Figure 13B:
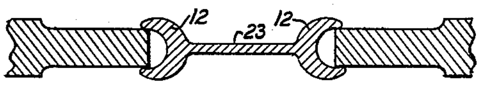
Figure 13C:
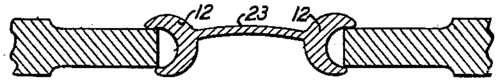

FIGURES 13*a*, 13*b* and 13*c* are detailed views on an enlarged scale showing the operation of the elastic element in the case of the embodiment shown in FIGURES 8 to 12.

Figure 14:
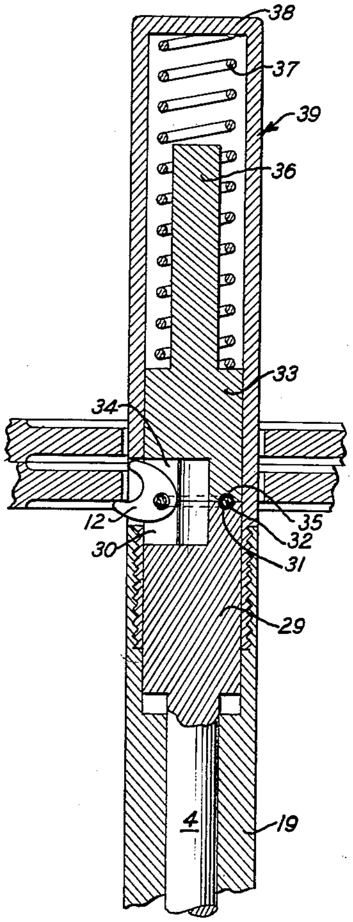
Figures 15, 16, 18:
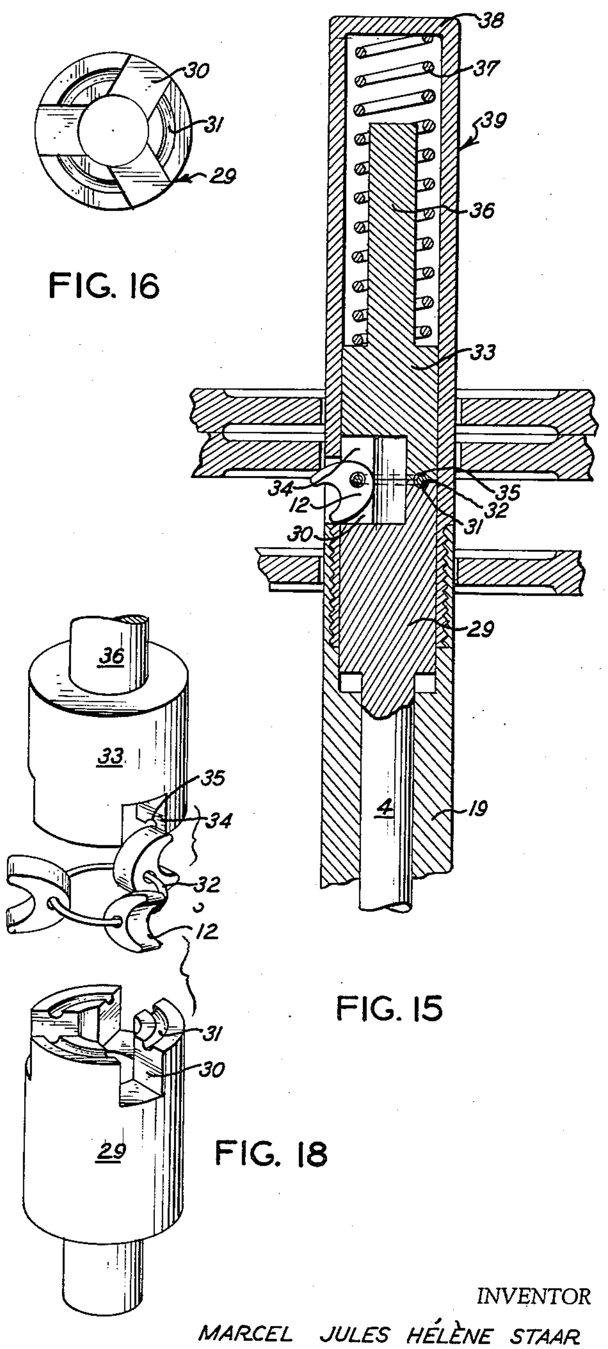

FIGURES 14 and 15 are vertical sections relating to another embodiment of hollow rod with the movable elements in two different positions.

FIGURE 16 is a top plan view of the lower cylinder.

Figure 17:
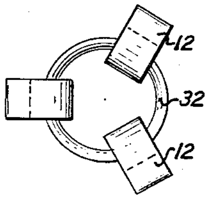

FIGURE 17 is a plan view showing the active elastic elements and a ring on which they are pivoted.

FIGURE 18 is an exploded view showing the fitting of the ring carrying the active resilient elments.

Figure 19A:
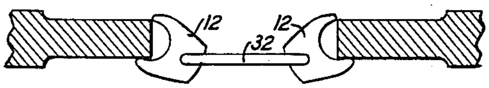
Figure 19B:
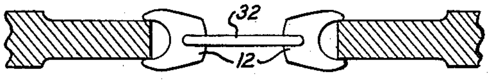
Figure 19C:
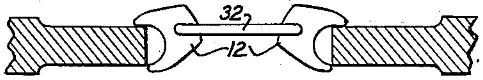

FIGURES 19*a*, 19*b*, and 19*c* are explanatory views.

Figure 21:
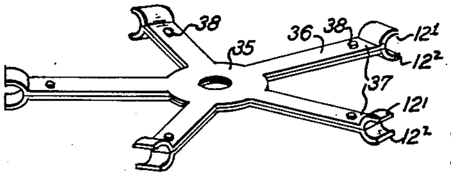
Figure 22:
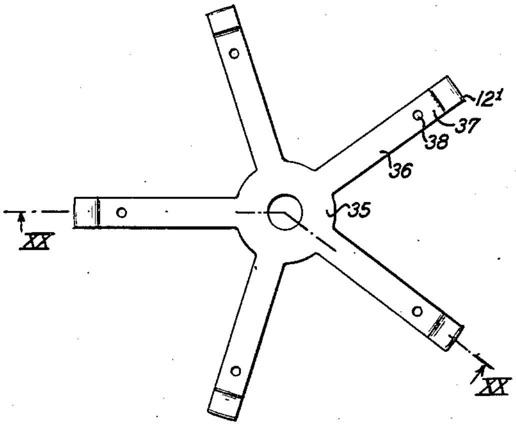
Figure 20:
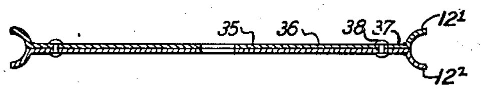

FIGURES 20, 21 and 22 relate to yet another embodiment, FIGURE 20 being a section on the line K—L in FIGURE 22 and FIGURES 21 and 22 being respectively a perspective and a plan view showing the supporting and distributing device.

Figure 1:
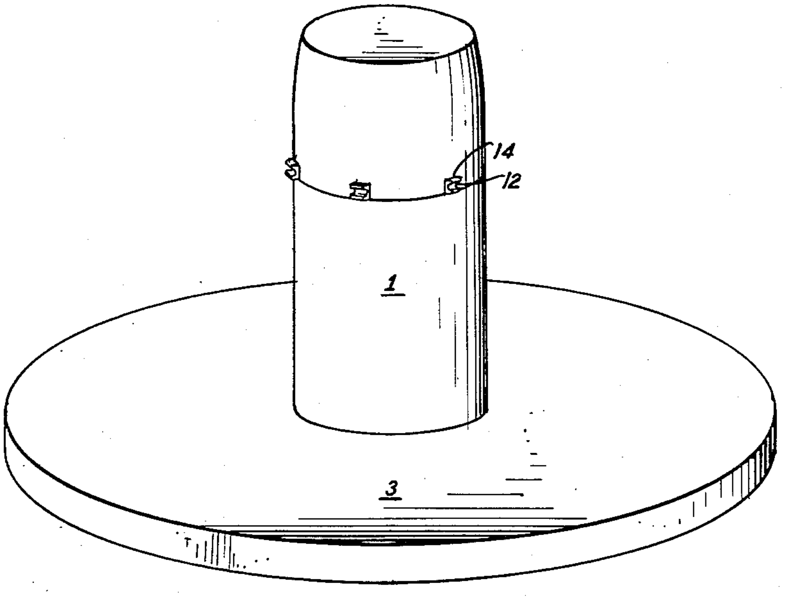
FIGURE 1 is a perspective view showing a distributing head mounted on a turntable and provided with a device provided in accordance with the invention.
Figure 2:
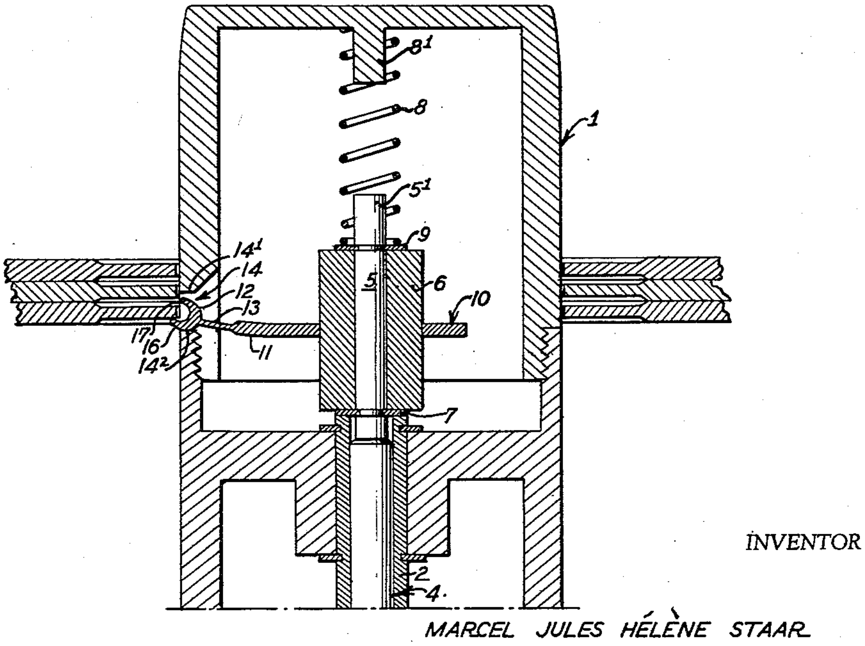

In FIGURES 1, 2 and 3 of the drawings, reference 1 denotes the distributing head on which the records to be played are disposed.

In the example illustrated, said head is fixed on a tube 2 (FIGURES 2 and 3) connected to the turntable 3 (FIGURE 1) and serving as a guide for a central control rod 4.

At the top, said rod has a thinned-down part 5, to which is connected a sleeve 6 which takes part in the reciprocating vertical sliding movements of the central rod 4 and which, in the bottom position of its travel, rests by means of a washer 7 on the upper part of the tube 2 which serves as a stop.

A spring 8 bears at its bottom on the sleeve 6 by means of a washer 9, being guided by the upper end $5^1$ of the rod 4, and at its top bears against the upper face of the head 1, being guided by a projection $8^1$ on said head.

Connected to the sleeve 6 is an annular plate 10 bearing radial arms 11 (FIG. 5) which are each extended by a strip 13 integral with a crescent-shaped element 12 which, like the strip 13, is of a resilient material which fits in a vertical slot or notch 14 in the distributing head and which has two limbs 15 (FIGURE 4), each provided with a rounded outer surface 16 intended to co-operate with the upper edge $14^1$ or lower edge $14^2$ of the slot 14, a terminal edge 17 and an inner surface 18.

The inoperative position of the device is as shown in FIGURE 2 wherein, under the action of the spring 8 alone, the said spring being predominant, the rod 4 has been pushed down until the sleeve 6 is situated against the upper part of the tube 2.

The lower limb of the crescent-shaped elements bears by its outer surface 16 against the lower edge $14^2$ of the slot 14 and only the lower branch projects out of the head to serve as a support for the records to be played.

On each record changing cycle, the rod 4 receives a thrust in the upward direction from the changing mechanism (arrow F, FIGURE 3), and this has the effect of raising the sleeve 6 while compressing the spring 8 (FIG. 3). On rising, the sleeve 6 takes with it by means of the plate 10 and the arms 11 the elastic elements 13 so that the outer surfaces of upper limbs 15 come into contact with the upper edges $14^1$ of the corresponding slots 14 and compel the assemblies 13—18 to swing down.

During this swinging operation, the edge 17 of the upper limb is inserted between the next-to-last and the last record while the inner surface 18 of the lower limb progressively frees the last record.

At the end of the movement, the bottom record is completely freed and drops on the turntable (FIGURE 3) while the remaining stack of records is supported by the outer part 16 of the upper limb of the elastic element.

When the rod 4 is released by the changer mechanism, the spring 8 acts downwardly on the sleeve 6 and on the rod 4 to return them to the initial inoperative position. The elastic assemblies swing in the opposite direction so that the records are freed by the upper limb of the elastic assemblies, slide down and bear again on the inner surfaces 18 of the lower limbs 15 of the elastic elements (FIGURE 2).

The above explanations show that the two-limbed elements 12 are mounted to rock under the action of the central rod and occupy two end positions, in each of which alternately one of the limbs is extended beyond the radius corresponding to that of the hole of the records and the other is retracted in relation to this radius.

During the swinging operation between the two end positions, the limb extending beyond the radius of the hole of the record is retracted to within this radius only when the other extends beyond said radius.

This result together with the penetration of the edge 17 of the upper limb between the two bottom records is facilitated by the deformation of the limbs and of the strips resulting from the combination comprising a thrust center and points of support.

Figure 6:
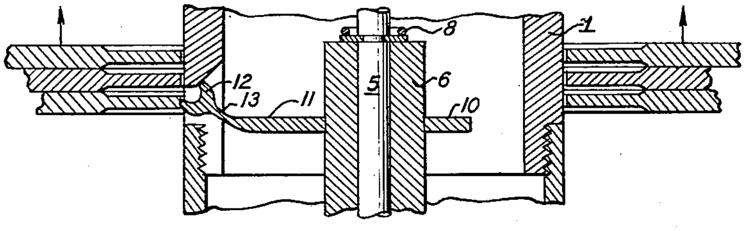
FIGURE 6 is a detail illustrating a particular property of the device forming the subject of the invention.

An important fact is that despite its simplicity this device enables records which have already been played to be removed without it being necessary to remove the central column; the elasticity of the assemblies 13—18 in fact permits the upward passage of the records which have been displaced upwardly (arrows FIGURE 6).

It will readily be seen that as a result of their elastic nature the elements 12 can perform effectively despite variations in thickness of the records.

FIGURES 7*a* and 7*b* show that each crescent-shaped element can receive between its limbs both a thin record (FIGURE 7*a*) and a thicker record (FIGURE 7*b*).

FIGURE 8 relates to another embodiment for records having a standard central, hole, wherein the distributing element is a hollow tube 9 terminating at the top in a tube end 20 of smaller diameter, provided with an external thread 21 and having four slots 22 offset by 90° and serving for the introduction of a washer 23 of elastic material carrying active elements 12 similar to those in FIGURES 1 to 7*b*.

The central rod 4 slides in the tube 19 and ends at the top in a projection 24 provided with a tapped hole in which engages a threaded end 25 carried by a head 26 connected to a guide tube 27.

Over the thread 21 fits a threaded sleeve 28 serving to guide the records of the stack, the active elements 12 engaging in slots formed between the bottom edge of the sleeve 28 and the upper edge of the tube 19. The operation of these elements is shown diagrammatically in FIGURES 8–9–13.

In FIGURE 8, the assembly is situated in the inoperative position; only the bottom limbs of the active elements are extended and support the records.

When the rod 4 is moved in the upward direction, the edge 17 of the upper limb of the crescent-shaped element engages firstly between the last and next-to-last records (FIGURE 13*a*) while the washer, which was curved in the downward direction, is first brought into a horizontal position in which the active element engages either side of the bottom record by its two limbs (FIGURE 13*b*), then the washer curves progressively upwards (FIGURE 13*c*) while the upper limb of the active element engages further between the two records. The record is finally released by the bottom limb as shown in FIGURE 9, while the upper limb 15 supports the stack by its outer surface 16.

FIGURES 14 to 18 relate to another variant, wherein the distributing element is again a tube 19 in which the central rod 4 moves. The rod 4 terminates at its top in a cylinder 29 provided with three slots 30.

The upper surface of this cylinder 29 is formed with a groove 31 of semi-circular section, in which is housed a wire 32 carrying the active elements 12.

The wire 32 is held in place by a second cylindrical element 33 also formed with vertical slots 34 fitting over the extension of the slots 30 so as to form openings to receive the active elements 12.

At its base, said cylinder 33 also has a semi-circular groove 35 which clamps the wire 32 on the bottom element 29.

At the top of the cylinder 33 has a projection 36 over which is fitted a spring 37 bearing on the end 38 of a threaded sleeve 39 threadably engaging the hollow rod 19.

When the rod 4 rises, the wire 32 on which the active elements are pivoted is driven by the cylinder 29 and under the effect of the upper and lower edges of the slot the active elements perform swinging movements (FIGURES 14, 15, 19*a*, 19*b* and 19*c*), in which the active elements assume successive positions similar to those shown in FIGURES 8, 9, 13*a*, 13*b* and 13*c*.

FIGURES 20, 21, 22 relate to yet another variant, wherein the two-limbed elements are formed by separate parts $12^1$ and $12^2$ and wherein there are fastened on the central rod two superimposed identical elements each formed by a plate 35 carrying arms 36 continued by strips joined to each of which is a limb $12^1$ or $12^2$. Each strip 37 and each element $12^1$—$12^2$ is of a resilient metal and screws or other connecting elements 38 are provided at the end of the arms 36 in order to connect together the arms of each of the parts.

What I claim is:

1. In combination with a turntable having a flat record bearing surface: a spindle concentric with said turntable and provided with radial openings spaced from said surface, crescent shaped record transferring elements in said openings and extending therefrom to support a stack of records deposited on said spindle, said crescent shaped elements each having extremities constituting spaced limbs adapted for extending outwardly of said spindle and for straddling individually all of the records in said stack, one of said limbs being positioned above the other, means rockably supporting said elements and normally supporting the same so that the lower of said limbs is extended and the upper retracted so that said stack is supported on the lower limbs, and means for rocking said elements so that the upper limbs are inserted between the lowermost record and the remainder of the stack and the lower limbs are retracted whereby said remainder is supported in position and said lowermost record is dropped onto said turntable, the latter said means sequentially rocking said elements to extend and retract the lower and upper limbs respectively whereby said stack is lowered onto said lowermost limbs.

2. In combination with a turntable having a flat record bearing surface: a spindle concentric with said turntable and provided with radial openings spaced from said surface, record transferring elements in said openings and extending therefrom to support a stack of records deposited on said spindle, said elements each comprising spaced limbs adapted for extending outwardly of said spindle and for straddling individually all of the records in said stack, one of said limbs being positioned above the other, means rockably supporting said elements and normally supporting the same so that the lower of said limbs is extended and the upper retracted so that said stack is supported on the lower limbs, and means for rocking said elements so that the upper limbs are inserted between the lowermost record and the remainder of the stack and the lower limbs are retracted whereby said remainder is supported in position and said lowermost record is dropped onto said turntable, the latter said means sequentially rocking said elements to extend and retract the lower and upper limbs respectively whereby said stack is lowered onto said lowermost limbs, said spindle comprising threadably engaged axially related parts cooperatively defining slots constituting said openings.

3. Apparatus comprising a turntable having a flat record bearing surface, a spindle concentric with said turntable and provided with radial openings spaced from said surface, record transferring elements in said openings and extending therefrom to support records deposited on said spindle, said elements each comprising spaced limbs adapted for extending selectively outwards of said spindle and being spaced by an amount adapted for straddling each of said records, one of said limbs being positioned above the other, means rockably supporting said elements and normally supporting the same so that the lower of said limbs is extended and the upper retracted whereby said records are supported on the lower limbs, and means for rocking said elements so that the upper limbs are inserted between the lowermost record and the remainder of said records and the lower limbs are retracted whereby said remainder is supported in position and said lowermost record is dropped onto said turntable, the latter said means sequentially rocking said elements to extend and retract the lower and upper limbs respectively and thereby lower said remainder onto said lowermost limbs, said means rockably supporting said elements comprising a ring and radially extending arms on said ring, said ring, arms and elements constituting an integral one-piece structure.

4. Apparatus comprising a turntable having a flat record bearing surface, a spindle concentric with said turntable and provided with radial openings spaced from said surface, record transferring elements in said openings and extending therefrom to support records deposited on said spindle, said elements each comprising spaced limbs adapted for extending selectively outwards of said spindle and being spaced by an amount adapted for straddling each of said records, one of said limbs being positioned above the other, means rockably supporting said elements and normally supporting the same so that the lower of said limbs is extended and the upper retracted whereby said records are supported on the lower limbs, and means for rocking said elements so that the upper limbs are inserted between the lowermost record and the remainder of said records and the lower limbs are retracted whereby said remainder is supported in position and said lowermost record is dropped onto said turntable, the latter said means sequentially rocking said elements to extend and retract the lower and upper limbs respectively and thereby lower said remainder onto said lowermost limbs, said means rockably supporting said elements comprising a ring, said elements being pivotally mounted on said ring.

5. Apparatus comprising a turntable having a flat record bearing surface, a spindle concentric with said turntable and provided with radial openings spaced from said surface, record transferring elements in said openings and extending therefrom to support records deposited on said spindle, said elements each comprising spaced limbs adapted for extending selectively outwards of said spindle and being spaced by an amount adapted for straddling each of said records, one of said limbs being positioned above the other, means rockably supporting said elements and normally supporting the same so that the lower of said limbs is extended and the upper retracted whereby said records are supported on the lower limbs, and means for rocking said elements so that the upper limbs are inserted between the lowermost record and the remainder of said records and the lower limbs are retracted whereby said remainder is supported in position and said lowermost record is dropped onto said turntable, the latter said means sequentially rocking said elements to extend and retract the lower and upper limbs respectively and thereby lower said remainder onto said lowermost limbs, said means rockably supporting said elements comprising a flat resilient washer and said elements are peripherally fixed on said washer.

6. Apparatus comprising a turntable having a flat record bearing surface, a spindle concentric with said turntable and provided with radial openings spaced from said surface, record transferring elements in said openings and extending therefrom to support records deposited on said spindle, said elements each comprising spaced limbs adapted for extending selectively outwards of said spindle and being spaced by an amount adapted for straddling each of said records, one of said limbs being positioned above the other, means rockably supporting said elements and normally supporting the same so that the lower of said limbs is extended and the upper retracted whereby said records are supported on the lower limbs, and means for rocking said elements so that the upper limbs are inserted between the lowermost record and the remainder of said records and the lower limbs are retracted whereby said remainder is supported in position and said lowermost record is dropped onto said turntable, the latter said means sequentially rocking said elements to extend and retract the lower and upper limbs respectively and thereby lower said remainder onto said lowermost limbs, said means rockably supporting said elements comprising corresponding flat rings including radially disposed spokes, said rings being connected in face-to-face relationship, each of said spokes supporting one of the limbs of one of said elements.

7. In combination with a turntable having a flat record bearing surface and a spindle concentric with said turntable and provided with radial openings spaced from said surface: record engaging elements in said openings and extending therefrom to support a stack of records deposited on said spindle, said elements each comprising spaced limbs adapted for extending outwardly of said spindle, one of said limbs being positioned above the other, means rockably supporting said elements and adapted for supporting the same so that the lower of said limbs is extended and the upper retracted whereby said stack is supported on the lower limbs, and means for rocking said elements so that the upper limbs are inserted between the lowermost record and the remainder of the stack and the lower limbs are retracted whereby said remainder is supported in position and said lowermost record is dropped onto said turntable, the latter said means sequentially rocking said elements to extend and retract the lower and upper limbs respectively whereby said lowermost limbs assume the function of supporting said stack, said spindle including upper and lower edge portions bounding said openings, said means rockably supporting said elements being displaceable to bring said elements into contact with said edge portions whereby said elements are rocked; said means for rocking said elements comprising a rod slidable on said spindle and engaged with the means rockably supporting said elements to displace the latter said means and rock said elements.

8. The combination as claimed in claim 1, wherein said means rockably supporting said elements includes means supporting said elements for rocking movement about respective axes parallel to the surface of said turntable.

9. The combination as claimed in claim 7 comprising a spring in said spindle resisting movement of said rod.

References Cited in the file of this patent

UNITED STATES PATENTS 2,666,647 Dale ------------------- Jan. 19, 1954

FOREIGN PATENTS 791,224 Great Britain ----------- Feb. 26, 1958